(12) United States Patent
Izhikevich

(10) Patent No.: US 8,103,602 B2
(45) Date of Patent: Jan. 24, 2012

(54) SOLVING THE DISTAL REWARD PROBLEM THROUGH LINKAGE OF STDP AND DOPAMINE SIGNALING

(75) Inventor: Eugene M. Izhikevich, San Diego, CA (US)

(73) Assignee: Neurosciences Research Foundation, Inc., San Diego, CA (US)

( * ) Notice: Subject to any disclaimer, the term of this patent is extended or adjusted under 35 U.S.C. 154(b) by 1040 days.

(21) Appl. No.: 11/963,403

(22) Filed: Dec. 21, 2007

(65) Prior Publication Data

US 2008/0162391 A1 Jul. 3, 2008

Related U.S. Application Data

(60) Provisional application No. 60/877,841, filed on Dec. 29, 2006.

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ........................................... 706/15
(58) Field of Classification Search ............... 706/25, 706/15
See application file for complete search history.

(56) References Cited

U.S. PATENT DOCUMENTS

| | | |
|---|---|---|
| 2002/0042563 A1 | 4/2002 | Becerra et al. |
| 2003/0177450 A1 | 9/2003 | Nugent |
| 2005/0261803 A1 | 11/2005 | Seth et al. |
| 2006/0129506 A1 | 6/2006 | Edelman et al. |

OTHER PUBLICATIONS

Ahissar, E. et al., Dependence on cortical plasticity on correlated activity of single neurons and on behavioral context, Science, Sep. 4, 1992, pp. 1412-1415, vol. 257.

Au-Young, Simon M. et al, Medial prefrontal cortical output neurons to the ventral tegmental area (VTA) and their responses to burst-patterned stimulation of the VTA: Neuroanatomical and in vivo electrophysiological analyses, Synapse, 1999, pp. 245-255, vol. 34.

(Continued)

*Primary Examiner* — Jeffrey A Gaffin
*Assistant Examiner* — Vincent Gonzales
(74) *Attorney, Agent, or Firm* — Fliesler Meyer LLP

(57) ABSTRACT

In Pavlovian and instrumental conditioning, rewards typically come seconds after reward-triggering actions, creating an explanatory conundrum known as the distal reward problem or the credit assignment problem. How does the brain know what firing patterns of what neurons are responsible for the reward if (1) the firing patterns are no longer there when the reward arrives and (2) most neurons and synapses are active during the waiting period to the reward? A model network and computer simulation of cortical spiking neurons with spike-timing-dependent plasticity (STDP) modulated by dopamine (DA) is disclosed to answer this question. STDP is triggered by nearly-coincident firing patterns of a presynaptic neuron and a postsynaptic neuron on a millisecond time scale, with slow kinetics of subsequent synaptic plasticity being sensitive to changes in the extracellular dopamine DA concentration during the critical period of a few seconds after the nearly-coincident firing patterns. Random neuronal firings during the waiting period leading to the reward do not affect STDP, and hence make the neural network insensitive to this ongoing random firing activity. The importance of precise firing patterns in brain dynamics and the use of a global diffusive reinforcement signal in the form of extracellular dopamine DA can selectively influence the right synapses at the right time.

8 Claims, 4 Drawing Sheets
(4 of 4 Drawing Sheet(s) Filed in Color)

OTHER PUBLICATIONS

Barad, Mark, et al., Rolipram, a type IV-specific phosphodiesterase inhibitor, facilitates the establishment of long-lasting long-term potentiation and improves memory, Dec. 1998, Proc. Natl. Acad. Sci. USA, pp. 15020-15025, vol. 95.

Barto, A.G., et al., Neuronlike adaptive elements that can solve difficult learning control problems, IEEE Transactions on Systems, Man and Cybernetics, Sep./Oct. 1983, pp. 835-846, vol. smc-13, No. 5.

Bi, Guo-qiang, al., Synaptic modifications in cultured hippocampal neurons: dependence on spike timing, synaptic strength, and postsynaptic cell type, Journal of Neuroscience, Dec. 15, 1998, pp. 10464-10472, vol. 18, No. 24.

Calabresi, P., et al., Dopamine and cAMP-regulated phosphoprotein 32 kDa controls both striatal long-term depression and long-term potentiation, opposing forms of synaptic plasticity, Journal of Neuroscience, Nov. 15, 2000, pp. 8443-8451, vol. 20, No. 22.

Cass, Wayne A., et al., In vivo assessment of dopamine uptake in rat medial prefrontal cortex: comparison with dorsal striatum and nucleus accumbens, Journal of Neurochemistry, 1995, pp. 201-207, vol. 65, No. 1.

Centonze, D., et al., Unilateral dopamine denervation blocks corticostriatal LTP, Journal of Neurophysiology, 1999, pp. 3575-3579, vol. 82.

Choi, Sukwoo, et al., Decreased probability of neurotransmitter release underlies striatal long-term depression and postnatal development of corticostriatal synapses, Proc. Natl. Acad. Sci. USA, Mar. 1997, pp. 2665-2670, vol. 94.

Connors, B. W., et al., Intrinsic firing patterns of diverse neocortical neurons, Trends in Neuroscience, 1990, pp. 99-104, vol. 13, No. 3.

Drew, Patrick J., et al., Extending the effects of spike-timing-dependent plasticity to behavioral timescales, Proc. Natl. Acad. Sci. USA, Jun. 6, 2006, pp. 8876-8881, vol. 103, No. 23.

Frey, Uwe et al., Synaptic tagging and long-term potentiation, Nature, Feb. 6, 1997, pp. 533-536, vol. 385.

Frey, Uwe et al., Dopaminergic antagonists prevent long-term maintenance of posttetanic LTP in the CA1 region of rat hippocampal slices, Brain Research, 1990, pp. 69-75, vol. 522.

Fusi, Stefano et al., Cascade models of synaptically stored memories, Neuron, Feb. 17, 2005, pp. 599-611, vol. 45.

Garris, Paul A., et al., Efflux of dopamine from the synaptic cleft in the nucleus accumbens of the rat brain, Journal of Neuroscience, Oct. 1994, pp. 6084-6093, vol. 14, No. 10.

Gerstner, Wulfram, et al., A neuronal learning rule for sub-millisecond temporal coding, Nature, Sep. 5, 1996, pp. 76-78, vol. 383.

Gurden, Hirac, et al., Essential role of D1 but not D2 receptors in the NMDA receptor-dependent long-term potentiation at hippocampal-prefrontal cortex synapses in vivo, Journal of Neuroscience, 2000, p. 106 (5 pages), vol. 20.

Hasselmo, Michael E., A model of prefrontal cortical mechanisms for goal-directed behavior, Journal of Cognitive Neuroscience, 2005, pp. 1-14, vol. 17, No. 7.

Impey, Soren et al., Induction of CRE-mediated gene expression by stimuli that generate long-lasting LTP in area CA1 of the hippocampus, Neuron, May 1996, pp. 973-982, vol. 16.

Izhikevich, Eugene M., Polychronization: computation with spikes, Neural Computation, 2006, pp. 245-282, vol. 18.

Izhikevich, Eugene M., et al., Spike-timing dynamics of neuronal groups, Cerebral Cortex, Aug. 2004, pp. 933-944, vol. 14.

Jay, T.M., et al., Plasticity of the hippocampal-prefrontal cortex synapses, J. Physiology (Paris), 1996, pp. 361-366, vol. 90.

Kempter, Richard, et al., Hebbian learning and spiking neurons, Physical Review E, Apr. 1999, pp. 4498-4514, vol. 59, No. 4.

Kempter, Richard, et al., Spike-based compared to rate-based hebbian learning, NIPS conference, Denver, Dec. 1998, Advances in Neural Information Processing Systems 11, 1999, MIT-Press, edited by M.S. Kearns et al., pp. 125-131.

Koene, Randal A. et al., An integrate-and-fire model of prefrontal cortex neuronal activity during performance of goal-directed decision making, Cerebral Cortex, Dec. 2005, pp. 1964-1981, vol. 15, No. 12.

Lauwereyns, Johan, et al., A neural correlate of response bias in monkey caudate nucleus, Nature, Jul. 25, 2002, pp. 413-417, vol. 418.

Levy, W.B. et al., Temporal contiguity requirements for long-term associative potentiation/depression in the hippocampus, Neuroscience, 1983, pp. 791-797, vol. 8, No. 4.

Lisman, John, A mechanism for the Hebb and the anti-Hebb processes underlying learning and memory, Proc. Natl. Acad. Sci. USA, Dec. 1989, pp. 9574-9578, vol. 86.

Ljungberg, Tomas, et al., Responses of monkey dopamine neurons during learning of behavioral reactions, Journal of Neurophysiology, Jan. 1992, pp. 145-163, vol. 67, No. 1.

Markram, Henry, et al., Regulation of synaptic efficacy by coincidence of postsynaptic APs and EPSPs, Science, Jan. 10, 1997, pp. 213-215, vol. 275.

Montague, P. Read, et al., A framework for mesencephalic dopamine systems based on predictive Hebbian learning, Journal of Neuroscience, Mar. 1, 1996, pp. 1936-1947, vol. 16, No. 5.

Montague, P. Read, et al., Dynamic gain control of dopamine delivery in freely moving animals, Journal of Neuroscience, Feb. 18, 2004, pp. 1754-1759, vol. 24, No. 7.

Otani, Satoru, et al., Dopaminergic modulation of long-term synaptic plasticity in rat prefrontal neurons, Cerebral Cortex, Nov. 2003, pp. 1251-1256, vol. 13, No. 11.

Otmakhova, Nonna A., et al., D1/D5 dopamine receptor activation increases the magnitude of early long-term potentiation at CA1 hippocampal synapses, Journal of Neuroscience, Dec. 1, 1996, pp. 7478-7486, vol. 16, No. 23.

Otmakhova, Nonna A., et al., D1/D5 dopamine receptors inhibit depotentiation at CA1 synapses via cAMP-dependent mechanism, Journal of Neuroscience, Feb. 15, 1998, pp. 1270-1279, vol. 18, No. 4.

Pan, Wei-Xing, et al., Dopamine cells respond to predicted events during classical conditioning: evidence for eligibility traces in the reward-learning network, Journal of Neuroscience, Jun. 29, 2005, pp. 6235-6242, vol. 25, No. 26.

Rao, Rajesh P.N., et al., Spike-timing-dependent hebbian plasticity as temporal difference learning, Neural Computation, 2001, pp. 2221-2237, vol. 13.

Seamans, Jeremy K, et al., The principal features and mechanisms of dopamine modulation in the prefrontal cortex, Progress in Neurobiology, 2004, pp. 1-57, vol. 74.

Seung, H.S., Learning in spiking neural networks by reinforcement of stochastic synaptic transmission, Neuron, Dec. 18, 2003, pp. 1063-1073, vol. 40.

Schultz, Wolfram, Predictive reward signal of dopamine neurons, J. Neurophysiology, 1998, pp. 1-27, vol. 80.

Schultz, Wolfram, Getting formal with dopamine and reward, Neuron, Oct. 10, 2002, pp. 241-263, vol. 36.

Schultz, Wolfram, Reward. Scholarpedia, 2007, p. 1652 (8 pages), vol. 2, No. 3.

Schultz, Wolfram, Reward signals. Scholarpedia, 2007, p. 2184 (19 pages), vol. 2, No. 6.

Schultz, Wolfram, et al., A neural substrate of prediction and reward, Science, Mar. 14, 1997, pp. 1593-1599, vol. 275.

Song, Sen, et al., Competitive hebbian learning through spike-timing-dependent synaptic plasticity, Nature Neuroscience, Sep. 2000, pp. 919-926, vol. 3, No. 9.

Suri, Roland E. et al., Temporal difference model reproduces anticipatory neural activity, Neural Computation, 2001, pp. 841-862, vol. 13.

Sutton, Richard S., Learning to predict by the methods of temporal differences, Machine Learning, 1988, pp. 9-44, vol. 3.

Swadlow, Harvey A., Efferent neurons and suspected interneurons in S-1 forelimb representation of the awake rabbit: receptive fields and axonal properties, Journal of Neurophysiology, Jun. 1990, pp. 1477-1498, vol. 63, No. 6.

Swadlow, Harvey A., Efferent neurons and suspected interneurons in motor cortex of the awake rabbit: axonal properties, sensory receptive fields, and subthreshold synaptic inputs, Journal of Neurophysiology, Feb. 1994, pp. 437-453, vol. 71, No. 2.

Watanabe, Masataka, Reward expectancy in primate prefrontal neurons, Nature, Aug. 15, 1996, pp. 629-632, vol. 382.

Wightman, R. Mark, et al., Control of dopamine extracellular concentration in rat striatum by impulse flow and uptake, Brain Research Reviews, 1990, pp. 135-144, vol. 15.

International Search Report and Written Opinion dated Jun. 25, 2008 for International Application No. PCT/US07/89129.

European Search Report dated Sep. 10, 2010 for European Application No. 07870093.7.

Baras, D. et al., Reinforcement learning, spike time dependent plasticity and the BCM rule, Sep. 8, 2006.

Bogacz, R. et al., Short-term memory traces for action bias in human reinforcement leaning, Proceedings of AISB '06, Apr. 3, 2006, vol. 1.

Daucé, E. et al., Hebbian learning in large recurrent neural networks, Actes de la lre Conference de Neurosciences Computationnelles, Oct. 23, 2006, pp. 202-205.

Farries, M. A. et al., Reinforcement learning with modulated spike timing-dependent plasticity (presentation abstract), Proceedings of the $2^{nd}$ Meeting on Computational and Systems Neuroscience (COSYNE), Mar. 17, 2005, Salt Lake City.

Florian, R. V., Reinforcement learning through modulation of spike-timing-dependent synaptic plasticity, Sep. 27, 2006.

Gavornik, J. et al., A network model that can learn reward timing using reinforced consolidation of synaptic plasticity (presentation abstract), Proceedings of the 2006 Annual Meeting of the SFN (Neuroscience '06), Oct. 16, 2006, Atlanta.

Guthrie, M., Chapter 6: Reward location learning, from Striatal Function Explored Through a Biophysical Model of a Medium Spiny Neuron, Ph.D. Thesis, Univ. of Edinburgh, 2006.

Izhikevich, Eugene M., et al., Solving the Distal Reward Problem Through Linkage of STDP and Dopamine Signaling, Cerebral Cortex, Jan. 13, 2007, pp. 2443-2452, vol. 17, No. 10.

Loewenstein, Y. et al., Operant matching is a generic outcome of synaptic plasticity based on the covariance between reward and neural activity, PNAS, Oct. 10, 2006, pp. 15224-15229, vol. 103, No. 41.

Neurosciences Institute, Research in theoretical neurobiology, Scientific Report, Dec. 2005, pp. 13-14.

Potjans, W. et al., Reinforcement learning in spiking neural networks (presentation abstract), Proceedings of the $2^{nd}$ Bernstein Symposium, Oct. 1, 2006.

Santiago, R.A. et al., Spike timing dependent plasticity implements reinforcement learning (presentation abstract), Actes du 28e Symposium International de Neuroscience Computationnelle, May 8, 2006, Montreal.

Taniguchi, T. et al., Symbol emergence by combining a reinforcement learning schema model with asymmetric synaptic plasticity, Proceedings of the $5^{th}$ International Conference on Development and Learning, May 31, 2006, Bloomington, Indiana.

Thivierge, J.-P. et al., Spiking neurons and plasticity: timing is everything, but concentration also matters (presentation abstract), Actes du 28e Symposium International de Neuroscience Computationnelle, May 8, 2006, Montreal.

Wörgötter, Florentin, et al., Temporal sequence learning, prediction, and control—a review of different models and their relation to biological mechanisms, Neural Computation, 2005, pp. 245-319, vol. 17.

SOLVING THE DISTAL REWARD PROBLEM THROUGH LINKAGE OF STDP AND DOPAMINE SIGNALING

CLAIM OF PRIORITY

This application claims priority to U.S. Provisional Application No. 60/877,841 entitled "SOLVING THE DISTAL REWARD PROBLEM THROUGH LINKAGE OF STDP AND DOPAMINE SIGNALING" by Eugene M. Izhikevich, filed Dec. 29, 2006 and incorporated herein by reference.

BACKGROUND OF THE INVENTION

1. Field of the Invention

The present invention relates generally to brain dynamics and, more particularly, to methods for solving the "distal reward problem" or "credit assignment problem."

2. Description of the Related Art

Learning the associations between cues and rewards (classical or Pavlovian conditioning) or between cues, actions, and rewards (instrumental or operant conditioning) involves reinforcement of neuronal activity by rewards or punishments. Typically, the reward comes seconds after reward-predicting cues or reward-triggering actions, creating an explanatory conundrum known in the behavioral literature as the distal reward problem and in the reinforcement learning literature as the credit assignment problem. Indeed, how does an animal know which of the many cues and actions preceding the reward should be credited for the reward? In neural terms, in which sensory cues and motor actions correspond to neuronal firings, how does the brain know what firing patterns, out of an unlimited repertoire of all possible firing patterns, are responsible for the reward if the firing patterns are no longer there when the reward arrives? How does the brain know which of the spikes of many neurons result in the reward if many of these neurons fire during the waiting period to the reward? Finally, how does a reinforcement signal in the form of the neuromodulator dopamine (DA) influence the right synapses at the right time, if DA is released globally to many synapses?

This problem, mentioned above as the distal reward problem in the behavioral literature or the credit assignment problem in the machine learning literature, is notoriously difficult to solve in autonomous robotics. Such robotic devices have to execute multiple steps before they achieve the goal and obtain a reward. There is a whole subfield of the machine learning field known as "reinforcement learning theory" that attempts to solve this problem using artificial intelligence and dynamic programming methods.

A similar problem exists when the behavior of the robot is controlled by a simulated neural network, as in what are known in the art as brain-base devices (BBDs). Indeed, how does the simulated neural network of a BBD know what firing patterns of what neurons are responsible for the reward if (a) the firing patterns are no longer there when the reward arrives and (b) most neurons and synapses are active during the waiting period to the reward? Traditionally, this problem is solved using one of the two assumptions: (1) the neural network is designed to be quiet during the waiting period to the reward; then the last firing neurons are the ones that are responsible for the reward, or (2) the firing patterns that are responsible for the reward are somehow preserved until the reward arrives; then whatever neurons are firing at the moment of reward are the ones that are responsible for the reward. Both assumptions are not suitable for BBDs because BBDs are embedded into and operate in real-world environments and thereby receive inputs and produce behavior all the time, even during the waiting period to the reward.

With respect to DA modulation of synaptic plasticity, an important aspect is its enhancement of what is known as long-term potentiation (LTP) and long-term depression (LTD). For example, in the hippocampus of the brain, dopamine D1 receptor agonists enhance tetanus-induced LTP, but the enhancement effect disappears if the agonist arrives at the synapses 15-25 seconds after the tetanus. LTP in the hippocampal→prefrontal cortex pathway is enhanced by direct application of DA in vivo or by burst stimulation of the ventral tegmental area (VTA), which releases DA. Correspondingly, D1 receptor antagonists prevent the maintenance of LTP, whereas agonists promote it via blocking depotentiation even when they are applied after the synapse plasticity-triggering stimuli. DA is also shown to enhance tetanus-induced LTD in layer 5 pyramidal neurons of the prefrontal cortex, and it gates corticostriatal LTP and LTD in striatal projection neurons.

Synaptic connections between neurons may be modified in accordance with what is known as the spike-timing dependent plasticity (STDP) rule. STDP involves both LTP and LTD of synapses: firing of a presynaptic neuron immediately before firing of a postsynaptic neuron results in LTP of synaptic transmission, and the reverse order of pre, post synaptic neuron firing results in LTD. It is reasonable to assume that the LTP and LTD components of STDP are modulated by DA the same way as they are in the classical LTP and LTD protocols. That is, a particular order of firing induces a synaptic change (positive or negative), which is enhanced if extracellular DA is present during the critical window of a few seconds.

SUMMARY OF THE INVENTION

A method is disclosed of solving the distal reward problem or the credit assignment problem using spiking neurons with spike-timing-dependent plasticity (STDP) modulated by a rewarding substance—e.g., dopamine (DA). Although STDP is triggered by nearly-coincident firing patterns on a millisecond time scale, slow kinetics of subsequent synaptic plasticity is sensitive to changes in the reward (DA) concentration during the critical period of a few seconds. Random firings during the waiting period to the reward do not affect STDP, and hence make the network insensitive to the ongoing activity. The network can selectively reinforce reward-triggering precise firing patterns, even if the firing patterns are embedded into a sea of noise and even if the rewards are delayed by seconds. Thus, if a behavior of a BBD is governed by precise firing patterns in a simulated nervous system and some patterns (some actions) consistently bring rewards, the synaptic connections between the neurons generating these patterns strengthen so that the BBD is more likely to learn and exhibit the same behavior in the same environmental context in the future.

In accordance with one embodiment of the present invention, the distal reward or credit assignment problem is solved using a simulated network of spiking neurons with DA modulated plasticity. DA modulation of STDP is shown to have a built-in property of instrumental conditioning: it can reinforce firing patterns occurring on a millisecond time scale even when they are followed by rewards that are delayed by seconds. This property relies on the existence of slow synaptic processes that act as "synaptic eligibility traces" or "synaptic tags."

These synaptic processes i.e., the eligibility traces or tags, are triggered by nearly-coincident spiking patterns of two neurons, but due to a short temporal window of STDP, the processes are not affected by random firings during the waiting period to the reward. For example, as described and illustrated more fully below, consider two neurons, each firing 1 spike per second, which is comparable to the spontaneous firing rate of neocortical pyramidal neurons. A nearly coincident firing of the two neurons will trigger STDP and change the synaptic tag. However, the probability that subsequent random spikes with the same firing frequency will fall within 50 ms of each other to trigger more STDP and alter the synaptic tag is quite small—on average once per 20 seconds. This "insensitivity" of the synaptic tags to the random ongoing neuronal spiking activity during the waiting period is a feature that distinguishes the present invention from previous studies, which require that the network be quiet during the waiting period or that the patterns be preserved as a sustained response. As further described below, DA-modulated STDP can selectively reinforce precise spike-timing patterns that consistently precede the reward, and ignore the other firings that do not cause the reward. This mechanism works when precise firing patterns are embedded into the sea of noise and would fail in the mean firing rate models.

Also, in accordance with the present invention, a spiking network implementation is described of the most important aspect of the temporal difference (TD) reinforcement learning rule—the shift of reward-triggered release of DA from unconditional stimuli to reward-predicting conditional stimuli.

Thus, the simulations described in the present application demonstrate how DA modulation of STDP may play an important role in the reward circuitry and solve the distal reward or credit assignment problem.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1(a) is an illustration of two coupled pre- and post-synaptic neurons used to explain the dynamics of a synapse governed by two variables, synaptic strength s and eligibility trace c;

FIG. 1(b) is a chart showing changes in the variable c over a time interval according to the known spike-timing-dependent plasticity (STDP) rule;

FIG. 1(c) is a magnification of the region shown in FIG. 1(d) by an "asterisk";

FIG. 1(d) is a graph illustrating the consistent rewarding of each event of post-synaptic firing of the post-neuron occurring within 10 ms after a pre-synaptic firing of the pre-neuron shown in FIG. 1(a);

FIG. 2(a) illustrates a continuous input stream of stimuli received by a network of groups of randomly chosen neurons, $S_1, S_2, \ldots$;

FIG. 2(b) is a histogram illustrating the response of the network to the stimuli of FIG. 2(a) at the beginning of an experiment to be described in the present application;

FIG. 2(c) is a histogram illustrating the response of the network to the stimuli of FIG. 2(a) after one hour of the experiment to be described;

FIG. 2(d) is a graph illustrating the mean excitation strength of synapses outgoing from the neurons in a group $S_1$ and the mean excitation strength of synapses in groups $S_2, S_3, \ldots$, in the remainder of the network;

FIG. 3(a) illustrates three groups S, A and B of randomly chosen neurons that correspond to the representation of an input stimulus and two (non-antagonistic) motor responses, respectively;

FIGS. 3(b) and (c) are graphs showing the responses of groups A and B of neurons of FIG. 3(a) over a number of trials;

FIG. 4(a) shows four random groups of neurons representing unconditional stimulus (US), two conditional stimuli $CS_1$ and $CS_2$, and a group $VTA_p$ responsible for the release of extracellular dopamine;

FIG. 4(b) is a histogram used to explain trials 1-100;

FIG. 4(c) is a histogram used to explain trials 101-200;

FIG. 4(d) is a histogram used to explain trials 201-300; and

FIG. 4(e) is an illustration used to explain the mechanism of the shift from group US of neurons to group $CS_1$ of neurons.

DETAILED DESCRIPTION OF THE INVENTION

I. Materials and Methods

Figure 1:
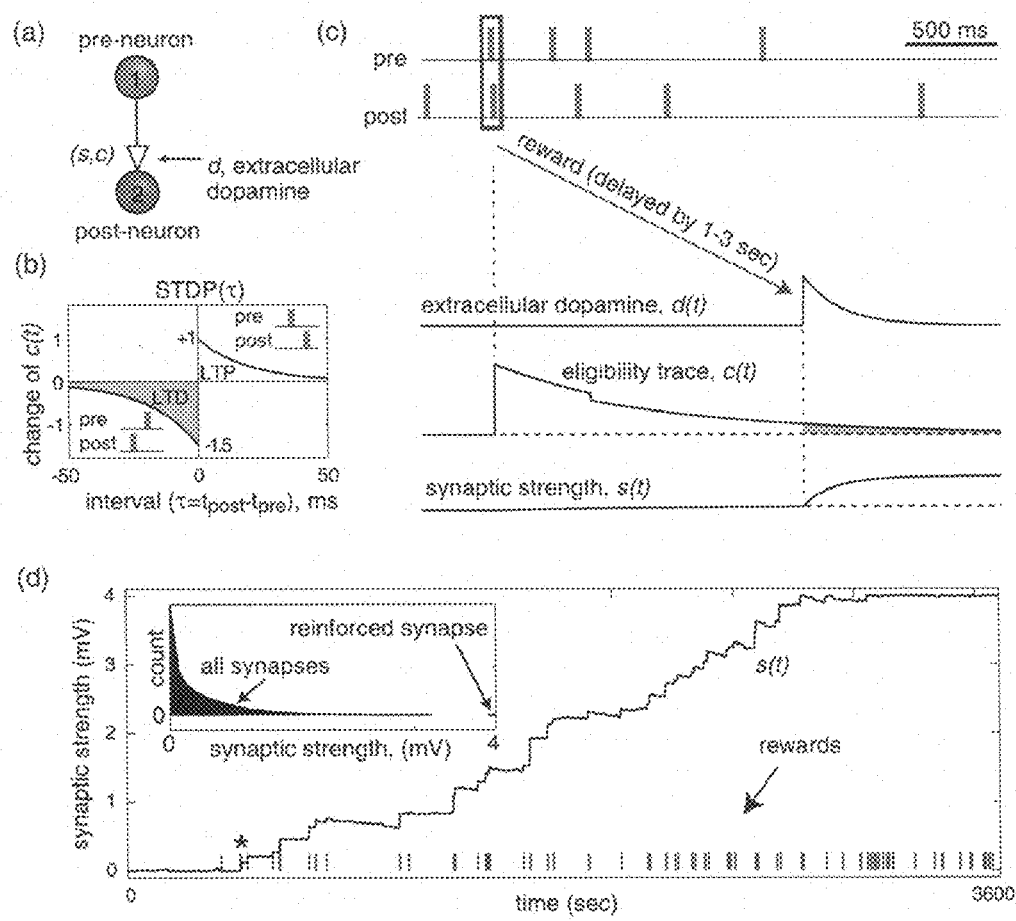
FIG. 1 shows generally the instrumental conditioning of a synapse in accordance with the present invention.

Details of the kinetics of the intracellular processes of the brain triggered by STDP and DA are unknown; therefore, in the present application the simplest phenomenological model that captures the essence of DA modulation of STDP is described. This is illustrated and to be described in relation to FIGS. 1(a)-FIG. 1(d).

With respect to FIG. 1(a), the dynamics of a synapse between the pre-neuron and a post-neuron are described by two phenomenological variables governed by Eqs. (1) and (2) set forth below: synapse strength s and eligibility trace c. The latter is gated by extracellular dopamine (DA) d as shown graphically in FIG. 1(c). Firings of the pre- and post-synaptic neurons shown in FIG. 1(a) induce changes to the variable c according to the spike-timing-dependent plasticity (STDP) rule, as shown in FIG. 1(b). These changes in variable c result in modification of the synaptic strength, s, only when extracellular dopamine d is present (d>0) during a critical window of a few seconds while the eligibility trace c decays to zero; see in FIG. 1(c) respective curves "extracellular dopamine d(t)" and "eligibility trace c(t)." (FIG. 1(c) is a magnification of the region in FIG. 1(d) marked by "*".)

To reinforce coincident firings of the two coupled pre, post neurons shown in FIG. 1(a), a reward is delivered each time a firing of the postsynaptic neuron occurs within 10 ms after a firing of the presynaptic neuron. This coincident firing of the pre, post neurons is shown by the blue rectangle in FIG. 1(c). This rare event increases variable c greater than any random firings (shown in FIG. 1(c)) of the same pre, post neurons during the delayed period of coincident pre, post neuron firings. The reward that is delivered is, as shown in FIG. 1(c), a step increase in the extracellular dopamine d provided at a delay of about 1-3 seconds from the coincident firings.

As shown in FIG. 1(d) and as will be further described, consistent rewarding of each such event of coincident pre, post neuronal firings results in the gradual increase of synaptic strength, s. This in turn increases the probability of coincident pre, post neuron firings and brings even more rewards of extracellular dopamine d. On the other hand, the time course of a typical un-reinforced synapse would look like a random walk near 0. The reinforced synapse, as shown in FIG. 1(d), is potentiated to the maximal allowable value 4 mV whereas the other synapses are not. The pre- and post-inset in FIG. 1(b) shows the distribution of all synaptic weights in a network before (dotted red) and after (green) the experiment.

More particularly, the state of each synapse using the two phenomenological variables (s,c), i.e., synaptic strength/weight, s, and activation of an enzyme important for plasticity, c, e.g., autophosphorylation of CaMK-II, oxidation of PKC or PKA, or some other relatively slow process acting as a "synaptic tag" is defined by:

$$\dot{c} = -c/\tau_c + STDP(\tau)\delta(t-t_{pre/post}) \quad (1)$$

$$\dot{s} = cd. \quad (2)$$

As already mentioned, d describes the extracellular concentration of dopamine DA, and $\delta(t)$ is the Dirac delta function that step-increases the variable c. Firings of pre- and postsynaptic neurons shown in FIG. 1(a), occurring at times $t_{pre/post}$, respectively, change c by the amount $STDP(\tau)$ depicted in FIG. 1(b), where $\tau = t_{post} - t_{pre}$ is the interspike interval. This variable c decays exponentially to c=0 with the time constant $\tau_c = 1$ second, as shown in FIG. 1(c). The decay rate controls the sensitivity of plasticity to delayed rewards. Variable c acts as the eligibility trace for synaptic modification, since it allows for change of the variable synaptic strength s via Eq. (2) gated by extracellular dopamine d. (Other, detailed biophysical/kinetic models that may be used as a description of the decay of variable "synaptic tag" c are possible.) As shown in FIG. 1(c), the decay of the eligibility trace c(t) is relatively fast, so that the effect of DA is negligible 5 seconds after the STDP-triggered coincident firing event, which is consistent with prior known experimental results in which no effect was observed when DA was delivered 15-25 seconds after the induction of plasticity.

The model described in the present application integrates, in a biophysically plausible way, the millisecond time scale of spike interactions in synapse-specific STDP with the slow eligibility trace c modulated by the global reward signal d corresponding to the behavioral time scale. There is no direct experimental evidence for or against this model; thus, the model makes a testable prediction, rather than a postdiction, on the action of DA on STDP based on purely theoretical considerations.

The variable d describes the concentration (µM) of extracellular DA, and it is the same for all synapses in the present described model (whereas variables c and s are different for different synapses). It is assumed that $\tau_d$ is the time constant of DA uptake and DA(t) models the source of DA due to the activity of dopaminergic neurons in the midbrain structures VTA (ventral tegmental area) and SNc (substantia nigra pars compacta) (described more fully with reference to FIG. 4). Other descriptions of DA kinetics are known in the art.

In the present simulations $\tau_d = 0.2$ second, which is greater than the experimentally measured time constant of DA uptake in striatum (around 0.1 second, as is known in the art) but smaller than that in the prefrontal cortex. The tonic source of DA is taken to be DA(t)=0.01 µM/s so that the baseline (tonic) concentration of DA is 2 nM as measured by microdialysis in the striatum and prefrontal cortex. The delivery of the reward of extracellular dopamine d in FIG. 1(c) is simulated as a burst of activity of dopaminergic neurons which step-increases the concentration of DA by 0.5 µM (i.e., DA(t)=0.5δ (t−$t_{rew}$) of µM/s at the moment of reward $t_{rew}$), which is in a range already measured in the art. Because the tonic level of DA is much lower than the phasic level during the reward, no significant modification of synaptic strength occurs (d≈0) unless the reward is delivered (d is large). In accordance with a further description of the invention below with reference to FIG. 4, DA(t)=0.004δ(t) µM/s is used for each spike fired by the neurons in a neuronal group $VTA_p$. A possible extension of Eqs. (1), (2) is to consider a vector of synaptic tags corresponding to a cascade of processes. In this case, the STDP-triggered increase of the synaptic eligibility trace c would not be instantaneous, as shown in FIG. 1(c) at the time of the coincident pre, post neuron firings. Instead, it would slowly increase and then decrease, like the synaptic alpha function but on a longer time scale. The slow increase would create a "refractory period" corresponding to the insensitivity to rewards that come too early.

II. Results

There will now be described, as one example, a spiking network of 1000 cortical neurons with DA-modulated STDP to illustrate various aspects of reinforcement of precise firing patterns embedded into a sea of noise. Following this description, in Section IIE below, there will be a discussion of the computer simulation including software to carry out the method of the present invention.

A. Reinforcing a Synapse

As shown in FIG. 1, contingent firing of two (pre and post) neurons (FIG. 1(a)) is reinforced by a delayed reward d to illustrate how DA-modulated STDP addresses the distal reward or credit assignment problem on the synaptic level. This example is motivated by an in vivo monkey experiment described in the art. The example may appear to be artificial in the context of animal learning, but it explains the mechanism responsible for reinforcement of more complicated spiking patterns, as is described further below.

In a network of 1000 neurons and 100,000 synaptic interconnections, a synapse is randomly chosen that connects two excitatory (pre, post) neurons, as shown in FIG. 1(a), and its synaptic strength is set manually to zero (s=0). The firing rate in the network is around 1 Hz, so every few minutes the post-synaptic neuron of FIG. 1(a) fires by chance within 10 ms after the presynaptic neuron of FIG. 1(a) fires. Every time such an event occurs, marked by the blue rectangle in FIG. 1(c), a reward d is delivered to the network in the form of a spike of extracellular DA with a random delay between 1 and 3 seconds. Since the delivery of the reward depends on what the network is doing, the example of FIG. 1 may be interpreted as the simplest form of instrumental conditioning.

In FIG. 1(d) the strength of the synapse (black curve) and the moments the rewards are delivered (blue bars) are plotted. At the beginning, the network receives unexpected rewards every few minutes, but it does not know what causes the rewards or when. Because of the delay to the reward, all neurons fire and all synapses are activated during the waiting period to the reward, and all synapses receive the same amount of reward (variable d). As in "instrumental conditioning," the system network determines on its own what patterns of spiking bring the reward and how to reinforce the synapses.

Each delivery of the reward d potentiates the chosen synapse of the pre, post neurons and brings the synapse closer to the maximal allowable value of 4 mV, as shown in FIG. 1(d). On average, the probability (frequency) of rewards triples, and the chosen synapse quickly reaches the maximal allowable value of 4 mV. Other synapses change as well, but none reach 4 mV. The distribution of all synaptic weights, depicted in the inset in FIG. 1(d), remains relatively unchanged. To test the robustness of this phenomenon, 50 simulated experiments were undertaken, each with a randomly chosen synapse and schedule of reward delays. In 42 out of 50 experiments, the chosen synapse reached the maximal allowable value within a 1-hour period, requiring only 40±8 rewards.

Why is the chosen synapse consistently potentiated, but the other 79,999 excitatory synapses are not? (Only excitatory synapses are plastic in the model.) Nearly coincident pre-then-post firing of the two respective neurons shown in FIG. 1(c) within the blue rectangle increases the value of the variable c, which acts as the eligibility trace (synaptic tag) for the modification of the synapse. The subsequent non-coincident firings of the two (pre, post) neurons also shown in FIG. 1(c) perturb variable c slightly because the function $STDP(\tau)$ in FIG. 1(b) is small for large interspike intervals $\tau$. As a result, eligibility trace variable c has a residual positive value shown in FIG. 1(c) when the delayed reward arrives at the end of the 1-3 second interval shown, so the synaptic strength s increases in proportion to cd; Eq. (2). A nearly coincident firing of the two (pre, post) neurons with the reverse order (post-then-pre) during the waiting period could make c negative, resulting in the decrease of s when the reward arrives, but the probability of such an adverse event during the waiting period is quite small (because the firing rate is small). There are many other pairs of neurons that fire nearly coincident spikes by chance just before the reward, so the corresponding synapses are also modified. However, the order of firing of these neurons is random, so after many firings, the positive and negative modifications cancel each other out, resulting in a net decrease of the synaptic weight (because the LTD area of the STDP curve shown in FIG. 1(b) is larger than the LTP area). As a result, across many trials, each reward d consistently potentiates only the chosen synapse and increases the cross-correlation between the pre- and postsynaptic neurons, thereby bringing more rewards.

B. Classical (Pavlovian) Conditioning

With reference to FIG. 2(a), there is illustrated a classical (Pavlovian) conditioning experiment: rewarding a conditional stimulus ($S_1$) embedded into a continuous stream of a large number of irrelevant but equally salient stimuli. To simulate the experiment, 100 random sets, $S_1, S_2, \ldots, S_{100}$, of 50 neurons each are selected to represent 100 random stimuli. To deliver a stimulus, e.g. $S_1$, all 50 neurons in the set $S_1$ are stimulated with a 1-ms pulse of superthreshold current. The nearly coincident firing of the pre, post neurons in stimulus $S_1$ reveals itself as a vertical strip in FIG. 2(b). The precise firing pattern is clearly seen only when activities of all neurons are plotted, but it cannot be seen in the activity of any individual neuron, since the spike evoked by stimulus $S_1$ is not different from any other spike of the neuron. Next, a continuous input stream is formed comprising stimuli $S_k$ ($1 \leq k \leq 100$) in a random order with random inter-stimulus intervals between 100 ms and 300 ms, i.e., on average 5 stimuli per second. Stimulus $S_1$ is treated as the conditional stimulus (CS) and the other stimuli as distracters. For every occurrence of $S_1$, a reward is delivered in the form of the increase of extracellular dopamine DA with a random delay of up to 1 second, as shown in FIG. 2(a) by the upward arrows titled "reward." The delay is large enough to allow many neurons in the network to fire a spike and to allow a few irrelevant stimuli during the waiting period, as shown in FIG. 2(b). Thus, the network receives rewards on average every 20 seconds caused by an unknown (to the network) firing pattern embedded into the sea of random spikes and distracters.

At the beginning of the experiment depicted in FIG. 2(b), all stimuli $S_1, S_2, \ldots$ have equal salience in the sense that they evoke coincident firings of 50 stimulated neurons. However, after a hundred of the conditional stimulus CS-reward parings, i.e., within the first hour, the response of the network to the particular conditional stimulus $S_1$ becomes reinforced, as indicated by the thick vertical strip in FIG. 2(c). As shown in FIG. 2(d), the averaged strength of excitatory synaptic connections from neurons in conditional stimulus $S_1$ becomes much stronger than the mean excitatory synaptic connections in the rest of the network. That is, the neurons in $S_1$ can strongly influence their postsynaptic targets, or, in other words, the other neurons in the network listen more closely to the neurons in $S_1$. The other neurons may contain motor neurons that trigger a conditional response. In this case, $S_1$ would trigger the response more often and stronger than any other stimulus $S_k$. The conditional response could be a simple movement in the anticipation of receiving the reward or a learned motor response, as in the instrumental (operant) conditioning discussed in Section IIC below. The other neurons may also contain neurons projecting to the midbrain dopaminergic neurons, as discussed in Section IID below. In this case, presentation of the conditional stimulus $S_1$ would trigger more DA release than presentation of any other stimulus $S_k$, i.e., $S_1$ would acquire a rewarding value.

How can the network select and reinforce a single firing pattern in the presence of noise and irrelevant patterns, especially since the rewards come with a delay? Presentation of every stimulus $S_k$ fires 50 neurons, which send spikes to other neurons in the network, possibly firing a few of them by chance. Because of the order pre-then-post, the synaptic connections from the 50 neurons to the fired neurons become eligible for potentiation, i.e., the corresponding tags $c_{ij}$ increase. If no DA reward is delivered within a critical period after this event, the synaptic tags $c_{ij}$ decay to zero (see FIG. 1(c)), resulting in small overall potentiation (due to the tonic level of DA) which is counterbalanced by depression (due to random spikes and the fact that the LTD window of STDP is greater than the LTP window as shown in FIG. 1(b)). However, if the DA reward comes within the critical period after the stimulation, the synapses are potentiated according to the mechanism depicted in FIG. 1(c). The stronger the synapses, the more excitation follows $S_1$, the more postsynaptic targets fire, leading to even greater potentiation of synapses from neurons representing the conditional stimulus $S_1$.

C. Stimulus-Response Instrumental Conditioning

Figure 3:
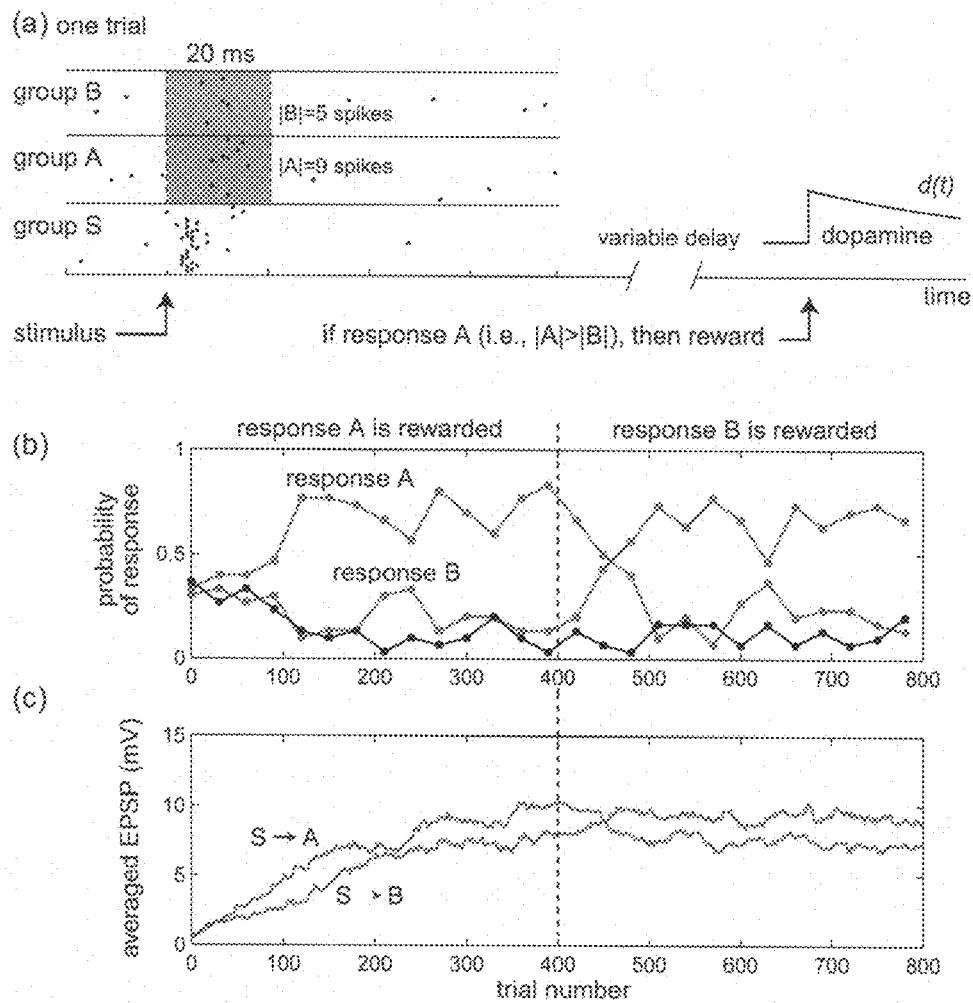
FIG. 3 generally shows instrumental conditioning.

FIG. 3 illustrates the simulation of a typical instrumental conditioning experiment: a network of 1,000 cortical spiking neurons is reinforced to produce an appropriate motor response to a stimulus. First, a random group of 50 neurons is selected, called group S, that represents the input stimulus to the network. Two random non-overlapping groups of 50 excitatory neurons each, called group A and group B, are also selected that give rise to two motor responses of the network. To deliver the stimulus (shown by the arrow labeled "stimulus" in FIG. 3(a)), a strong 1-ms pulse of current is injected into the neurons in group S to make them fire, as shown in FIG. 3(a) (the 2-3 ms delay is due to the spike upstroke). Their coincident firing typically evokes a few spikes in the other neurons in the network. During a 20 ms time window after the stimulation, the number of spikes fired by neurons in group A and group B, denoted as |A| and |B|, respectively, are counted. The network is said to exhibit response A when |A|>|B|, response B when |B|>|A|, and no response otherwise (e.g., when |B|=|A|=0 or 1). (A stronger requirement, e.g., |A|>2|B| for response A, would still be effective, but it takes a longer time to reinforce.) The neurons in groups A and B may be thought of as projecting to two motor areas that innervate two antagonistic muscles; to produce a noticeable movement, one group A, B has to fire more spikes than the other group A, B.

The simulated experiment consists of trials separated by 10 sec. In each trial, illustrated in FIG. 3(a), stimulation to neurons in group S is delivered (see the arrow "stimulus") and the response of the network is monitored. If the response is A (more spikes in group A than in group B), a reward is delivered in the form of the increase of extracellular DA with a delay of up to 1 second (the delay is inversely proportional to the ratio |A|/|B|, so that greater ratios result in faster movements and earlier rewards). During the first few trials, the probability of response of group A is the same as that of group B; see FIG. 3($b$), but then it quickly increases to nearly 80% in less than 100 trials. As a control, after the first 400 trials (occurring at the dotted vertical line of FIG. 3($b$)) the reward to response B is started. The probability of response group A decreases while that of group B increases, and the network switches its behavior after less than 50 trials after the first 400 trials. This experiment was repeated 20 times, selecting random sets S, A, and B. The network learned the correct response all 20 times. The only variability was the number of trials needed to reach the 80% correct probability of responses. Increasing the learning rate can decrease the number of required trials to just a few—consistent with animal experiments. However, the small size of the network would make the network responses less reliable (noisier) in this case.

Figure 2:
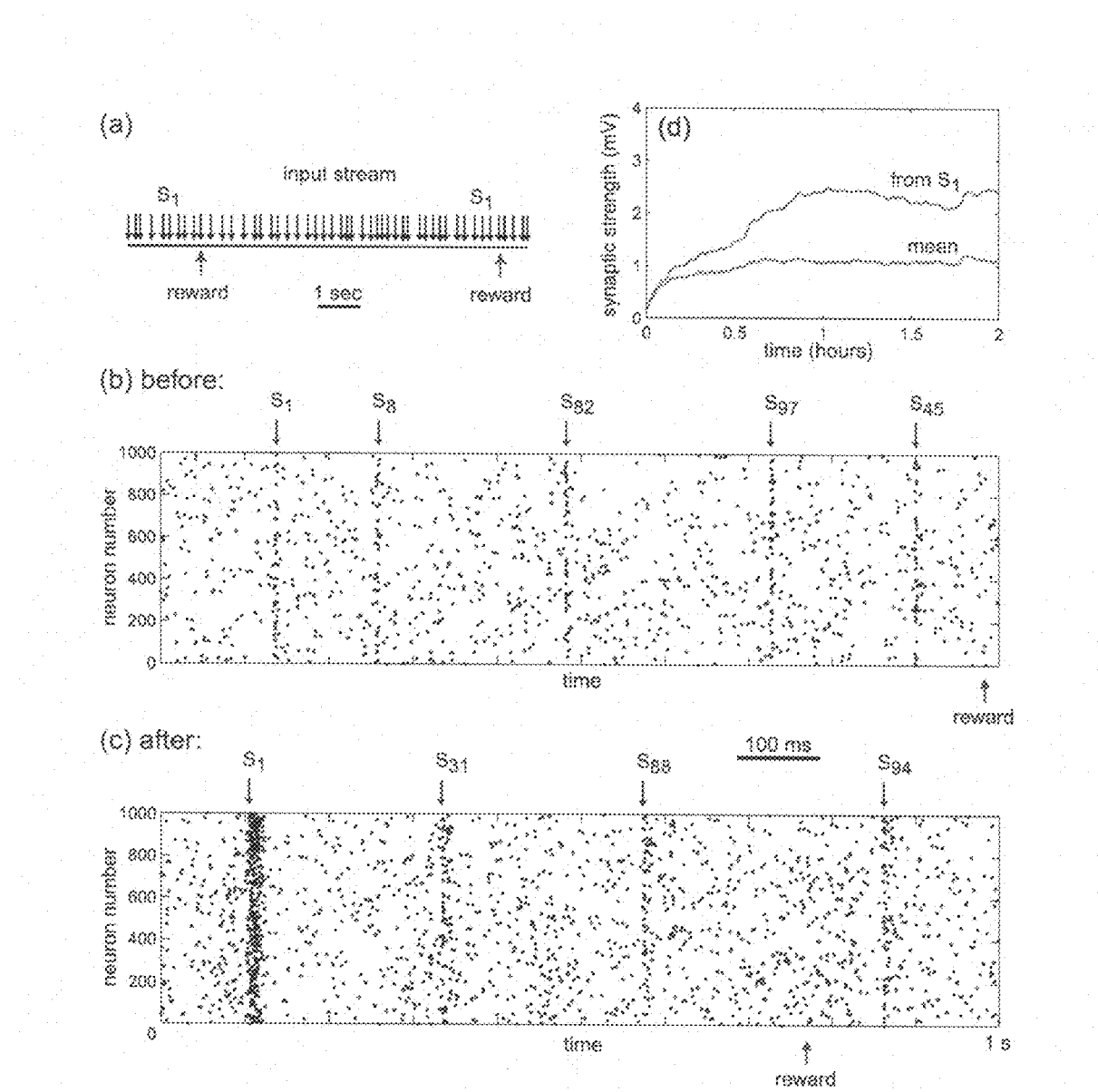
FIG. 2, generally, are diagrams used to describe classical (Pavlovian) conditioning.

The number of spikes fired by the neurons in group A and group B depends on the strength of the synaptic connections from S to A and B. Rewarding the response of group A reinforces connections to A, as can be seen in FIG. 3($c$), according to the same mechanism as described in FIG. 1($a$) for the pair of pre and post neurons. It also reinforces connections from group S to group B (because there is no winner-take-all competition between neurons in A and B), as well as connections from group S to any other neuron in the network (as shown in FIG. 2), though to a lesser degree. Indeed, if a neuron in group B starts to fire in response to the stimulation, but there are still more spikes in group A, the reward still comes and the connections from group S to that neuron in group B are potentiated. This may continue as long as |A|>|B|. A possible behavioral interpretation of this effect is that the network generalizes that rewards are delivered in response to stimulation S. Conversely, rewarding group B after 400 trials makes connections S→B stronger than connections S→A. The contrast between the synaptic connections to A and B can be further enhanced (and the percentage of correct choices improved) via anatomical constraints, such as stronger winner-take-all lateral inhibition. In this description of the present invention, the anatomy is kept simple (all-to-all with 10% connectivity) to emphasize the role of DA modulation of STDP over any other mechanism.

It is to be noted that a simple combinatorial consideration shows that there are more than 10164 different choices of two groups of 50 neurons out of 800 excitatory neurons. The network does not know the identity of the neurons in group A and group B, nor does it know the rules of the game or the schedule of the rewards. It receives seemingly arbitrary rewards and it determines on its own what brings the rewards and what it must do to increase the frequency of the rewards.

D. Shift of DA Response from US to Reward-Predicting CS in Classical Conditioning With reference to FIG. 4, the basic phenomenology of shifting the release of DA in response to an unconditional stimulus (US) to an earlier reward-predicting conditional stimulus (CS) is discussed. The shift of the release of DA occurs automatically when VTA (Ventral Tegmental Area) projecting neurons are part of the whole network and the synapses onto these neurons are subject to the same DA-modulated STDP. Demonstrating the shift is the first step toward a spiking network implementation of what is known as the temporal difference (TD) error signal. The full spiking implementation of TD would require modeling the looping anatomy of striatum and basal ganglia, which is not described in the present specification.

First, a random group of 100 excitatory neurons is selected and it is assumed that this group, called $VTA_p$, represents cortical projections to the ventral tegmental area (VTA) of the midbrain. VTA refers to the area in midbrain and $VTA_p$ refers to the group of neurons projecting to VTA (subscript "p" stands for "projecting"). Thus, it is assumed that the midbrain activity, and hence the amount of DA released into the network, is proportional to the firing rate of the neurons in this group. Next, a random group of excitatory neurons that represents the unconditional stimulus, called US, and two groups, $CS_1$ and $CS_2$ that represent two conditional stimuli, are chosen; see FIG. 4($a$).

To simulate the prior association between the group US and the release of DA, the weights of synaptic connections from the group US to the group $VTA_p$ (projecting to VTA) are reset to the maximal allowable values. (This can be achieved by repeating the classical conditioning experiment described with reference to FIG. 2 with group $S_1$ being the group US.) Thus, stimulating neurons in the group US results in a strong response in the VTA-projecting neurons $VTA_p$, and hence releases DA, whereas stimulating any other random group of neurons does not result in significant response of the group $VTA_p$. This is the only difference between the group US and the other neurons in the network. (Apparently, there are multiple pathways from US-triggered activity in the brain to the VTA; here only one, the cortical pathway, is considered.)

During the first 100 trials, where each trial is separated by 10-30 seconds, the neurons in the group US (but not the groups $CS_1$ and $CS_2$), are injected with a superthreshold current. Because of the strong initial projections from group US to group $VTA_p$, this stimulation evokes a reliable response in the group $VTA_p$ resulting in the elevation of extracellular dopamine DA, and maintaining (reinforcing) the projections (indeed, due to the spontaneous release of DA, synapses are plastic all the time and may depress because STDP is dominated by LTD). The histogram in FIG. 4($b$) shows the response of the entire group $VTA_p$ on the last trial (No. 100), and the spike raster shows a typical response of a single neuron in the group in 100 consecutive trials, which is similar to the in vivo recorded responses of midbrain neurons to unexpected rewards, novel, and salient stimuli.

Figure 4:
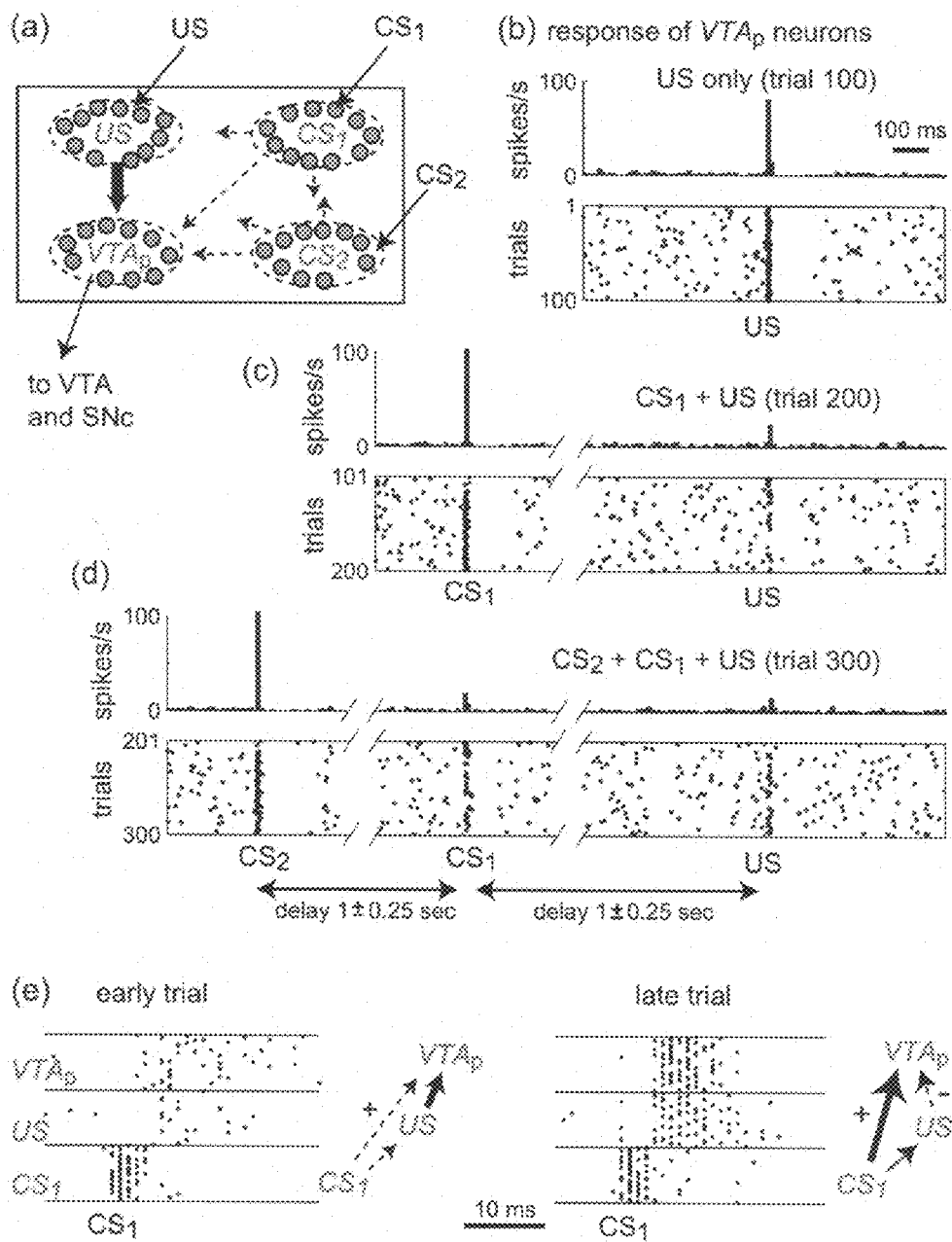
FIG. 4 illustrates generally the spiking neuron implementation of a shift of the DA response amongst random groups of neurons.

During trials 101 to 200, neurons in the group $CS_1$ are stimulated, and then neurons in the group US are stimulated with a random delay 1±0.25 seconds. As shown in FIG. 4($c$), the group $VTA_p$ neurons start to fire in response to the reward-predicting conditional stimulus $CS_1$, just after a few trials, as was observed in the art in vivo in monkeys and rats. The response of the neurons to the group US slowly decreases, so the response of the entire group $VTA_p$ to the last trial (histogram in FIG. 4($c$)) is diminished. During trials 201 to 300, group $CS_2$ is presented 1±0.25 seconds prior to group $CS_1$, which is 1±0.25 seconds prior to group US. As can be seen in FIG. 4($d$), the response of the neuron switches to the earliest reward-predicting stimulus, group $CS_2$, though there is still some response to group $CS_1$ and the group US, again, consistent with prior known in vivo work.

The mechanism of switching of the response from the group US to the earlier group CS relies on the sensitivity of STDP to the order of firings occurring within tens of milliseconds (despite the fact that each group CS and group US is separated by one second). Due to the random connections in the network, stimulation of group $CS_1$ neurons causes some neurons in the group US to fire, which in turn causes some neurons in the group $VTA_p$ to fire; see FIG. 4($e$) in the early trial. In essence, presentation of the group CS triggers the reactivation of the activity chain leading to the reward, $CS_1$-then-US-then-VTA, but on a compressed time scale. This property emerged in the spiking network spontaneously. Due to the same mechanism as described in connection with FIG. 1, the order of firing $CS_1$-then-VTA, and the subsequent release of DA due to the presentation of the group US, potentiates the direct synaptic projections $CS_1 \rightarrow VTA_p$, resulting in the increased response to the group $CS_1$, as seen in FIG. 4(c), at left. After many trials, neurons in group $VTA_p$ can fire in response to firings of $CS_1$ neurons alone, simultaneously or often before they receive spikes from the group US neurons, as indicated in FIG. 4(e) for the late trial. As a result of a jittered and often inverse order of firing, $VTA_p$-then-US, and the fact that the LTD part of STDP as shown in FIG. 1(b) is dominant over the LTP part of STDP, the synaptic projections US→$VTA_p$ depress, resulting in the decreased (unlearned) response to the group US seen in FIG. 4(c), to the right. The same mechanism is responsible for the switching of the response from group $CS_1$ to group $CS_2$ shown in FIG. 4(d). Again, this property appears spontaneously in a randomly connected network of spiking neurons with STDP.

E. Computer Simulations

All of the simulations described above, particularly those described in Section I, Materials and Methods, may be carried out using a network of 1,000 spiking neurons described in detail in a published article by the inventor of the present invention, entitled "Polychronization: Computation with Spikes," Neural Computation 18:245-282, by Eugene M. Izhikevich, 2006, pgs. 245-282. This article in its appendix entitled "Appendix: The Model," at pages 274-278 describes the MATLAB and C code, which appendix and its computer code are incorporated by reference herein in their entirety. The computer code also is described in the published article, available on the author's webpage, www.izhikevich.com, since prior to Dec. 29, 2006, the priority date of the present application.

The network has 80% excitatory neurons of the regular spiking (RS) type and 20% inhibitory neurons of the fast spiking (FS) type, representing the layer ⅔ part of a cortical minicolumn. Neurons are randomly connected with 10% probability so that there are 100 synapses per averaged neuron. The connections, combined with the random input simulating noisy miniature PSPs, make neurons fire Poisson-like spike trains with an average frequency around 1 Hz. This low frequency of firing is important for the low probability of sequential spikes to fall within the STDP time window by chance (the firing rate in neocortical layer ⅔ is much less than 1 Hz). The maximal axonal conduction delay is taken to be 1 ms. Each excitatory synapse is modified according to Eqs. (1) and (2) given above, with STDP depicted in FIG. 1(b), but the weights are limited to the range 0 to 4 mV (i.e., clipped at 0 and 4 mV). Both excitatory-to-excitatory and excitatory-to-inhibitory synaptic connections are subject to the same STDP rule. A different, more physiological STDP rule could be used for the latter connections, or even keep them fixed (non-plastic). The choice described in the present specification was done for the sake of simplicity and to be consistent with previous implementations of the spiking model as described in the above-mentioned published article by the present inventor. Inhibitory synapses are not plastic in the model. The LTD area shown in FIG. 1(b) is 50% greater than the LTP area shown in FIG. 1(b) so that uncorrelated firing of any two neurons results in the decrease of synaptic strength between them. As a result of spontaneous activity, the strengths of excitatory synapses in the network converge to the exponential distribution depicted in the inset in FIG. 1(d). As illustrated, all synapses are much weaker than the maximal allowable value of 4 mV, and the majority is less than 0.1 mV.

III. Further Discussion of the Present Invention

A. Generally

Described above is a biologically realistic implementation of what is known as Pavlovian and instrumental conditioning, and some aspects of temporal difference (TD) reinforcement learning using a spiking network with DA-modulated STDP. Based on prior experimental evidence that DA modulates classical LTP and LTD, it has been assumed that DA has a permissive, enabling effect allowing STDP to take place—a testable assumption that is believed not to have been suggested before. Although STDP acts on a millisecond time scale, the slow biochemical kinetics of synaptic plasticity could make it sensitive to DA rewards delayed by seconds. In the discussion above the spiking network is interpreted as representing a small part of the prefrontal cortex receiving numerous dopaminergic projections from the midbrain and projecting to the midbrain, though this theory can be applied to neostriatum and basal ganglia as well. The described simulations provide a neurally plausible mechanism of how associations between cues, actions, and delayed rewards are learned (FIGS. 1-3), as well as how DA response shifts from unconditional stimuli US to reward-predicting conditional stimuli CS (FIG. 4).

B. Spiking Implementation of Reinforcement Learning

Spiking implementation of reinforcement learning has been suggested in the art, and there are many models based on synaptic eligibility traces c (shown in FIG. 1(c)). All of these models are believed to have a common drawback: they require the network to be quiet during the waiting period to the reward; see arrow labeled "reward" in FIG. 1(c), with the illustrated waiting period occurring from the coincident firings of the pre, post neurons indicated by the blue rectangle to the time a step increase in the amount of extracellular dopamine d is delivered. Indeed, random neuronal activity during the waiting period triggers synaptic transmission in all synapses, alters the eligibility traces, and impedes learning. In contrast, STDP is insensitive to random firings during the waiting period but sensitive only to precise firing patterns. Since the set of precise patterns is sparse in the space of all possible firing patterns, DA-modulated STDP takes advantage of this fact and renders a superior mechanism of reinforcement learning.

Prior discussions consider explicitly the relationship between STDP and TD, but ask the opposite question: how to get STDP from TD acting on a millisecond time scale and how the resulting STDP depends on the dendritic location? In this sense, the results of the present invention are complementary to those of these prior discussions.

C. Synaptic Eligibility Traces

The slow kinetics of synaptic plasticity, modeled by the variable c (see Eq. (1)), results in the existence of synaptic eligibility traces c. This idea is known in the art of classical machine learning algorithms, where eligibility traces are assigned to cues and actions, as in the TD(λ) learning rule. To make the machine learning algorithms work, the network needs to know in advance the set of all possible cues and actions that may lead to the reward. In contrast, there is a combinatorially large number of possible spike-timing patterns that could trigger STDP and which could represent unspecified cues and actions of the spiking network; see the above-mentioned published article by the present inventor. Any one of them can be tied to the reward by the environment or by the experimenter, and the network can figure out which one on its own is tied to the reward, using a more biologically plausible way than TD($\lambda$) or other machine learning algorithms do.

D. Spiking Implementation of TD

The model described in the present specification shows a possible spiking network implementation of some aspects of temporal difference (TD) reinforcement learning: the shift of DA response from group US to reward-predicting group $CS_1$, and group $CS_2$ as shown in FIG. 4. This property is not built in into the model, but appears spontaneously when synapses are allowed onto VTA-projecting neurons to be affected by DA the same way as any other synapses in the network. Thus, the shift is a general property of DA-modulated STDP applied to synaptic circuits projecting to VTA. The mechanism of the shift is quite unexpected: it takes advantage of the sensitivity of STDP to the fine temporal structure of the firing of group US, CS, and VTA-projecting neurons during the presentation of CS, as was explained above in connection with FIG. 4(e).

It may be noted that the DA response described in relation to FIG. 4 is not a true error prediction signal required by TD algorithms because the model fails to exhibit depression of firing rate (dip) in the activity of the $VTA_p$ group when group US is omitted. On the one hand, the depression would not be expected because the intervals between groups $CS_1$, $CS_2$ and US are random. However, the depression would not occur even if the intervals were fixed, because there is no internal clock or anticipatory signal that tells the network when US is expected. To get the depression of firing rate, the group US anticipatory signal generated by the caudate nucleus and globus pallidus of the brain could be simulated, and inhibitory neurons stimulated at the moment the US is expected to arrive. Also, it should be noted that the DA response described in relation to FIG. 4 does not exhibit a gradual shift in latency, as predicted by known TD models, but jumps from group US to reward-predicting groups $CS_1$, $CS_2$, which is more consistent with the effects observed in in vivo experiments. Consistent with these recordings, the DA response to US in FIG. 4 does not diminish completely, but remains above a baseline level. Finally, an unexpected presentation of the US after training would result in a diminished DA response in the model because the synaptic connections US$\rightarrow VTA_p$ are depressed, i.e., the association is unlearned, in contrast to in vivo recordings showing a strong response. Thus, DA-modulated STDP is sufficient to reproduce some aspects of TD reinforcement learning in biologically relevant terms of spiking activity and synaptic plasticity, but not all aspects. To address all aspects, the network architecture would need to be refined and anatomical loops introduced similar to those of basal ganglia of the brain.

E. Spiking vs. Mean-Firing Rate Models

The results described in the present specification emphasize the importance of precise firing patterns in brain dynamics: the mechanism presented in this specification works only when reward-predicting stimuli correspond to precise firing patterns. Only synchronous patterns embedded into the sea of noise are considered, but the same mechanism would work equally well for polychronous firing patterns, i.e., time-locked but not synchronous. Interestingly, rate-based learning mechanisms would fail to reinforce the patterns. Indeed, presentation of a cue, such as group $S_1$ shown in FIG. 2, does not increase the firing rate of any neuron; it just adds, removes, or changes the time of a single spike of each of the 50 neurons in S1. In particular, the neurons continue to fire Poissonian-looking spike trains with 1-2 spikes per second. The information about the stimulus is contained only in the relative timings of spikes, which are seen as vertical stripes in FIG. 2, and which are effective to trigger STDP. A mean firing rate description of the same network would result in neuronal activities having constant values, corresponding to constant firing rates, with no possibility to know when stimulation occurs.

Interestingly, DA-modulated STDP, it is believed, would fail to reinforce firing rate patterns. Indeed, large firing rate fluctuations produce multiple coincident spikes with random pre-post neuron order, so STDP dominated by LTD would result in the average depression of synaptic strength. Thus, even when the firing coincidences of pre, post neurons are not rare, STDP can still decouple chance coincidences due to rate-based dynamics from causal pre-post neuron relations due to spike-timing dynamics. This is how DA-modulated STDP differs from rate-based learning rules and this is why it is so effective to selectively reinforce precise firing patterns, but insensitive to firing rate patterns.

F. Rewards vs. Punishments

The present invention may be used to model not only rewards but also punishments. Indeed, the variable d may be treated as a concentration of extracellular DA above a certain baseline level. In this case, negative values of d, interpreted as concentrations below the baseline, result in active unlearning of firing patterns, that is, in punishments. Another way to implement punishment is to assume that DA controls only the LTP part of STDP. In this case, the absence of a DA signal results in overall depression of synaptic connections (punishment), certain intermediate values of DA result in an equilibrium between LTD and LTP parts of STDP (baseline), and strong DA signals result in potentiation of eligible synaptic connections (reward). There is anecdotal evidence in the art that the STDP curve has a very small LTP part in the prefrontal and motor cortices of the brain which affect personal communication. The model described in the present specification makes a testable prediction that the STDP curve will look quite different if DA is present during or immediately after the induction of synaptic plasticity.

IV. Conclusion

DA modulation of STDP provides a solution to the distal reward/credit assignment problem: Only nearly-coincident spiking patterns are reinforced by rewards, while uncorrelated spikes during the delay period to the reward do not affect the eligibility traces (variables c), and hence are ignored by the network. In contrast to previous theoretical studies, (1) the network does not have to be quiet during the waiting period to the reward, and (2) reward-triggering patterns do not have to be retained by recurrent activity of neurons. If a spiking pattern out of a potentially unlimited repertoire of all possible patterns consistently precedes or triggers rewards (even seconds later), the synapses responsible for the generation of the pattern are eligible for modification when the rewards arrive and the pattern is consistently reinforced (credited). Even though the network does not know what pattern was credited, it is more likely to generate the same pattern in the same behavioral context in the future.

Consequently, a computer simulated neural network based on the algorithms described above of the present invention can selectively reinforce reward-triggering precise firing patterns even if these firing patterns are embedded into a sea of noise and even if the rewards are delayed by seconds. Thus, known brain-based devices (BBDs) including robotic BBDs which are controlled by simulated nervous systems and operate in a real-world environment, can have their simulated nervous systems modified in accordance with the algorithms and code of the present invention. As so modified, with the behavior of a BBD being governed by precise firing patterns in the simulated nervous system and some patterns (i.e. some real-world actions) bringing rewards, the synaptic connections between the neurons of the computer simulated nervous system generating these firing patterns are strengthened, so that the BBD is more likely to exhibit the same behavior in the same context in the future. Thus, the methods of the present invention are biologically plausible and simple to implement in simulations and, if desired, in special-purpose hardware. The methods of the present invention can then be implemented to be a part of every spiking neural network designed to control a robot capable of operating in and learning its real-world environment through rewards and punishments.

What is claimed is:

1. In a computer-implemented simulated nervous system network having a first pre-neuron and a second post-neuron, and a synaptic pathway between the first pre-neuron and the second post-neuron having synaptic strength (s) and an eligibility trace (c), a software-executable method for determining a firing pattern of the first pre-neuron and the second post-neuron, comprising:
   (a) firing the first pre-neuron and the second post-neuron to induce changes to the synaptic strength (s) according to a spike-timing-dependent plasticity (STDP) rule; and
   (b) providing extracellular dopamine to the synaptic pathway during a window of time after the firing and the eligibility trace (c) decays to zero.

2. A method according to claim 1, wherein the window is in the range of a few seconds.

3. A method according to claim 1, further comprising delivering to the synaptic pathway an increase of dopamine each time a post-synaptic firing of the post-neuron occurs within a certain time after a pre-synaptic firing of the pre-neuron to increase the synaptic strength (s).

4. A method according to claim 3, wherein the increase in dopamine is provided at a random delay of between 1-3 seconds after the firing of the pre-neuron and the post-neuron and each time the post-neuron firing occurs within about 10 ms after the pre-neuron firing to reinforce the firing of the first pre-neuron and the second post-neuron.

5. A method according to claim 4, wherein the increase in dopamine is provided until the synaptic pathway is potentiated up to a maximum allowable value.

6. A method according to claim 4, wherein the maximum allowable value is 4 mV.

7. In a computer-implemented simulated nervous system network having a first pre-neuron and a second post-neuron, and a synaptic pathway between the first pre-neuron and the second post-neuron having synaptic strength (s) and an eligibility trace (c), a software-executable method for implementing reinforcement learning in a spiking network based on spike timing dependent plasticity (STDP), comprising:
   (a) firing the first pre-neuron and the second post-neuron within a substantially coincident time of one another to induce changes to the synaptic strength (s) according to a spike-timing-dependent-plasticity (STDP) rule;
   (b) detecting an eligibility trace (c) over a time window commencing with the substantially coincident firings of the first pre-neuron and the second post-neuron, the eligibility trace (c) decaying towards zero over the time window; and
   (c) providing an extracellular global diffusive reinforcement signal to the synaptic pathway during the time window and providing an increase in the reinforcement signal at a time in the window occurring at about 1-3 seconds after the coincident firing and commencement of the time window.

8. In a computer-implemented simulated nervous system network having four random groups of neurons, representing, respectively, an unconditional stimulus (US), a first conditional stimulus ($CS_1$), a second conditional stimulus ($CS_2$), and cortical projections ($VTA_p$) that project to a ventral tegmental area (VTA) of a brain responsible for releasing dopamine, and in which there are synaptic connections from the unconditional stimulus (US) groups of neurons to the cortical projections ($VTA_p$) group of neurons, and from the first conditional stimulus ($CS_1$) group of neurons, and the second conditional stimulus ($CS_2$) group of neurons, a software-executable method of shifting the release of dopamine in response to the unconditional stimulus (US) to an earlier reward-predicting conditional stimulus ($CS_1$) and ($CS_2$), comprising:
   (a) initially setting the synaptic connections from the unconditional stimulus (US) groups of neurons to maximum values;
   (b) firing the neurons of the unconditional stimulus (US) groups of neurons to induce changes to the synaptic strength (S) according to a spike-timing-dependent plasticity (STDP) rule, and to cause a response in the neurons of the cortical projections ($VTA_p$);
   (c) firing the neurons of the first conditional stimulus ($CS_1$) prior to firing the unconditional stimulus (US) by about 1±0.25 seconds to induce changes to the synaptic strength (S) in accordance with the STDP rule and to shift to and evoke a response by the cortical projections ($VTA_p$) to the first conditional stimulus ($CS_1$) of neurons; and
   (d) firing the neurons of the second conditional stimulus ($CS_2$) prior to firing the neurons of the first conditional stimulus ($CS_1$) by about 1±0.25 seconds to induce changes to the synaptic strength (S) in accordance with the STDP rule and to shift to and evoke a response by the cortical projections ($VTA_p$) to the second conditional stimulus ($CS_2$) of neurons.

* * * * *